(12) United States Patent
Fong et al.

(10) Patent No.: US 7,104,870 B2
(45) Date of Patent: Sep. 12, 2006

(54) MODIFIED RADIAL MOTION (MRM) METHOD FOR MODIFYING LENGTHWISE CURVATURE OF FACE-MILLING SPIRAL BEVEL AND HYPOID GEARS

(76) Inventors: Zhang-Hua Fong, No. 305, Shing Nung Rd., San Shing Village, Min Shiung Hsiang, Jia Yi Hsieng (TW); Pei Yu Wang, No. 38, Da Shin Rd., Shin Shuen Village, Pu Yan Hsiang, Jang Hua Hsieng (TW)

( * ) Notice: Subject to any disclaimer, the term of this patent is extended or adjusted under 35 U.S.C. 154(b) by 0 days.

(21) Appl. No.: 10/760,285

(22) Filed: Jan. 21, 2004

(65) Prior Publication Data

US 2005/0159080 A1 Jul. 21, 2005

(51) Int. Cl.
*B24B 1/00* (2006.01)
(52) U.S. Cl. ............... 451/41; 451/5; 451/8; 451/9; 451/10; 451/11; 451/28; 451/47; 451/48; 451/177; 451/178; 451/180
(58) Field of Classification Search ............. 451/5, 451/8, 9, 10, 11, 28, 47, 48, 177, 178, 180
See application file for complete search history.

(56) References Cited

U.S. PATENT DOCUMENTS

| 4,565,474 A | * | 1/1986 | Charles | ............... | 409/51 |
| 5,088,243 A | * | 2/1992 | Krenzer | ............... | 451/47 |
| 6,449,486 B1 | * | 9/2002 | Rao | ............... | 455/456.1 |

* cited by examiner

*Primary Examiner*—Lee D. Wilson
*Assistant Examiner*—Shante L. McDonald
(74) *Attorney, Agent, or Firm*—Leong C. Lei (57) ABSTRACT

The present invention relates to a modified radial motion method for modifying lengthwise curvature of face-milling spiral bevel and hypoid gears, which is capable of modifying a locus of a cutter center into a curve, without changing a head cutter's geometry, by providing modified radial motion of the head cutter cooperating with rotation of a cradle. The modified radial motion method in accordance with the present invention completely solves the contradictions caused by the existing lengthwise curvature modification methods, which is able to increase the adjustability of the gear set without reducing the tooth contact.

3 Claims, 12 Drawing Sheets

| | Original Pinion Convex | Original Pinion Concave |
|---|---|---|
| | Zero position E=0, P=0 | Zero position E=0, P=0 |
| a. Contact patterns by grid scan method |  |  |
| b. Contact patterns by differential geometry |  |  |
| c. kinematic errors |  |  |
| | MRM Correction Pinion Convex | MRM Correction Pinion Concave |
| | Zero position E=0, P=0 | Zero position E=0, P=0 |
| a. Contact patterns by grid scan method |  |  |
| b. Contact patterns by differential geometry |  |  |
| c. kinematic errors |  |  |

Fig. 6

| | Original Pinion Convex | Original Pinion Concave |
|---|---|---|
| | Mean  E=-0.04135  P=0.05438 | Mean  E=-0.02185, P=0.021 |
| a. Contact patterns with grid scan method | | |
| b. Contact patterns with differential geometry | | |
| c. kinematic errors | | |
| | MRM Correction Pinion Convex | MRM Correction Pinion Concave |
| | Mean  E=-0.05743, P=0.10072 | Mean E=-0.02085, P=0.01616 |
| a. Contact patterns with grid scan method | | |
| b. Contact patterns with differential geometry | | |
| c. kinematic errors | | |

Fig. 7

| | Original Pinion Convex | Original Pinion Concave |
|---|---|---|
| | Heel E=0.17734 P=-0.1782 | Heel E=-0.22682, P=0.19089 |
| a. Contact patterns with grid scan method | | |
| b. Contact patterns with differential geometry | | |
| c. kinematic errors | | |
| | Correction Pinion Convex | Correction Pinion Concave |
| | Heel E=0.26599, P=-0.39054 | Heel E=-0.28242, P=0.39892 |
| a. Contact patterns with grid scan method | | |
| b. Contact patterns with differential geometry | | |
| c. kinematic errors | | |

Fig. 8

| | Original Pinion Convex | Original Pinion Concave |
|---|---|---|
| | Toe  E=-0.19643    P=0.22794 | Toe  E=0.12221   P=-0.10699 |
| a. Contact patterns with grid scan method | | |
| b. Contact patterns with differential geometry | | |
| c. kinematic errors | | |
| | Correction Pinion Convex | Correction Pinion Concave |
| | Toe  E=-0.29122, P=0.51505 | Toe  E=0.14    P=-0.2932 |
| a. Contact patterns with grid scan method | | |
| b. Contact patterns with differential geometry | | |
| c. kinematic errors | | |

MODIFIED RADIAL MOTION (MRM) METHOD FOR MODIFYING LENGTHWISE CURVATURE OF FACE-MILLING SPIRAL BEVEL AND HYPOID GEARS

BACKGROUND OF THE INVENTION

1. Field of the Invention

The present invention relates to a modified radial motion method for modifying lengthwise curvature of face-milling spiral bevel and hypoid gears, which is capable of modifying a locus of a cutter center into a curve, without changing a head cutter's geometry, by providing modified radial motion of the head cutter cooperating with rotation of a cradle.

2. Description of the Prior Arts

The purpose of lengthwise curvature modification is to change the contact pattern of the gear sets. The related existing methods are:

1) Changing the head cutter's geometry. Such as U.S. Pat. No. 5,004,127 proposes method to modify tooth form with modified grinding wheel.

2) Modifying the roll ratio between the cradle and the work-gear. Just as disclosed by U.S. Pat. No. 4,780,990.

However, adjustability of the gear set (V-H value) is accordingly changed after the lengthwise curvature modification in tooth surface. The main problem that the industrial sector confronts is the adjustability of the gear set decreases while the tooth contact pattern is increasing (decrease the Heizian contact stress). Adjustability of the gear set and tooth contact are the main index data indicating the quality of the gear, which usually contradict to each other. The primary object of the present invention is to solve the contradiction.

In recent years, CNC hypoid generator has taken the place of the conventional cradle type hypoid generator. The motion of CNC hypoid generator is holding-type-orthogonal motion. U.S. Pat. No. 4,981,402 discloses a Multi-axis bevel and hypoid gear generating machine having six flexibilities, which including three translational axes (x-axis, y-axis, z-axis) and three rotational axes (cutter-axis, work-gear-axis and machine-root-angle-axis). The three translational axes are arranged in mutually orthogonal directions. The spatial relationship between the cutter-axis and the work-gear-axis is described by the machine-root-angle-axis and the three translational axes (x-axis, y-axis, z-axis). Another hypoid generating machine disclosed by WIPO 02/066,193, which has six flexibilities, including three translational axes (x-axis, y-axis, z-axis) and three rotational axis (cutter-axis, work-gear-axis and machine-root-angle-axis). The three translational axes are arranged in mutually orthogonal directions. The spatial relationship between the cutter-axis and the work-gear-axis is described by the machine-root-angle-axis and the three translational axes (x-axis, y-axis, z-axis). The machine-root axis consists of cradle.

Figure 1:
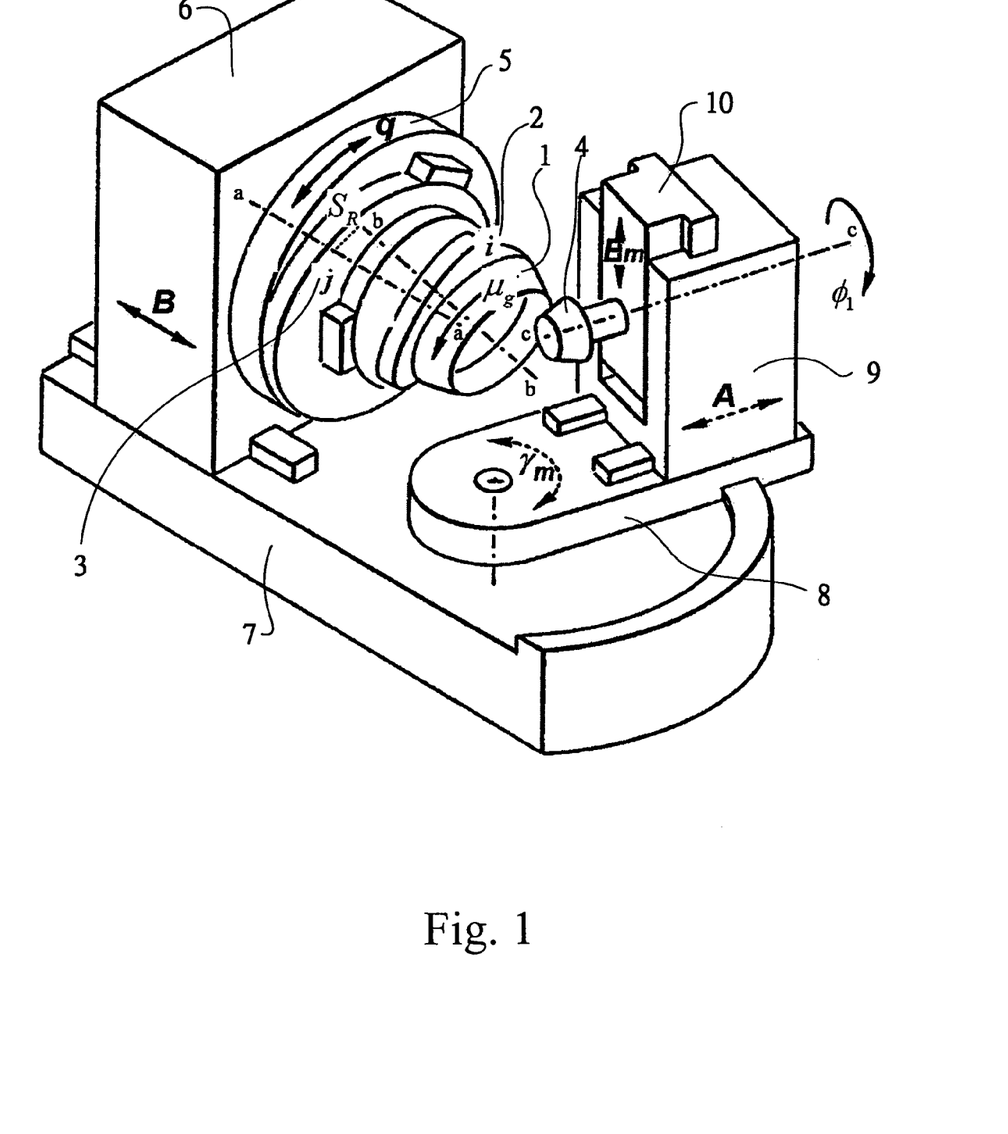
FIG. 1 is a structural view of the existing cradle type hypoid generator.

There are two lengthwise curvature modification methods existing in the industrial sector, one is head cutter's geometry change and the other is by modifying the roll ratio between the cradle and the work-gear. However, the head cutter's geometry change requires the resetting of the machine setting, which is time consuming. The cradle type hypoid generating machine being currently applied in the industrial sector is shown in FIG. 1, wherein cutter 1 is mounted on a rotation plate 2, on the cutter 1 is arranged with blade. The rotation plate 2 is mounted on an eccentric disc 3, the tilt of the head cutter is determined by rotation angles of i (rotation plate 2) and j (eccentric disc 3). The eccentric disc 3 is disposed on the cradle 5. When the head cutter is not tilt, i=0,j=0, cutter 1 is mounted on the cradle 5 directly. The radial setting $S_R$ is the shortest distance between cutter-axis b—b and cradle-axis a—a on the reference machine plane. The machine plane is fixed to the basement and the unit normal is the cradle-axis a—a. When the cradle rotates, the generating of tooth is achieved by taking use of the relative motion between the cutter and the work gear 4. The radial setting of the cradle type hypoid generating machined currently used in industrial sector is constant, in case of rotation of the cradle, the locus of the cutter center on the machine plane is a circular arc, rotation angle of the cradle q and the radial setting $S_R$ determine the position of the cutter center.

The present invention has arisen to mitigate and/or obviate the afore-described disadvantages of the conventional lengthwise curvature modification methods.

SUMMARY OF THE INVENTION

The primary object of the present invention is to provide a modified radial motion method for modifying lengthwise curvature of face-milling spiral bevel and hypoid gears, which is capable of modifying a locus of a cutter center into a curve, without changing a head cutter's geometry, by providing modified radial motion of the head cutter cooperating with rotation of a cradle.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENT

Figure 2:
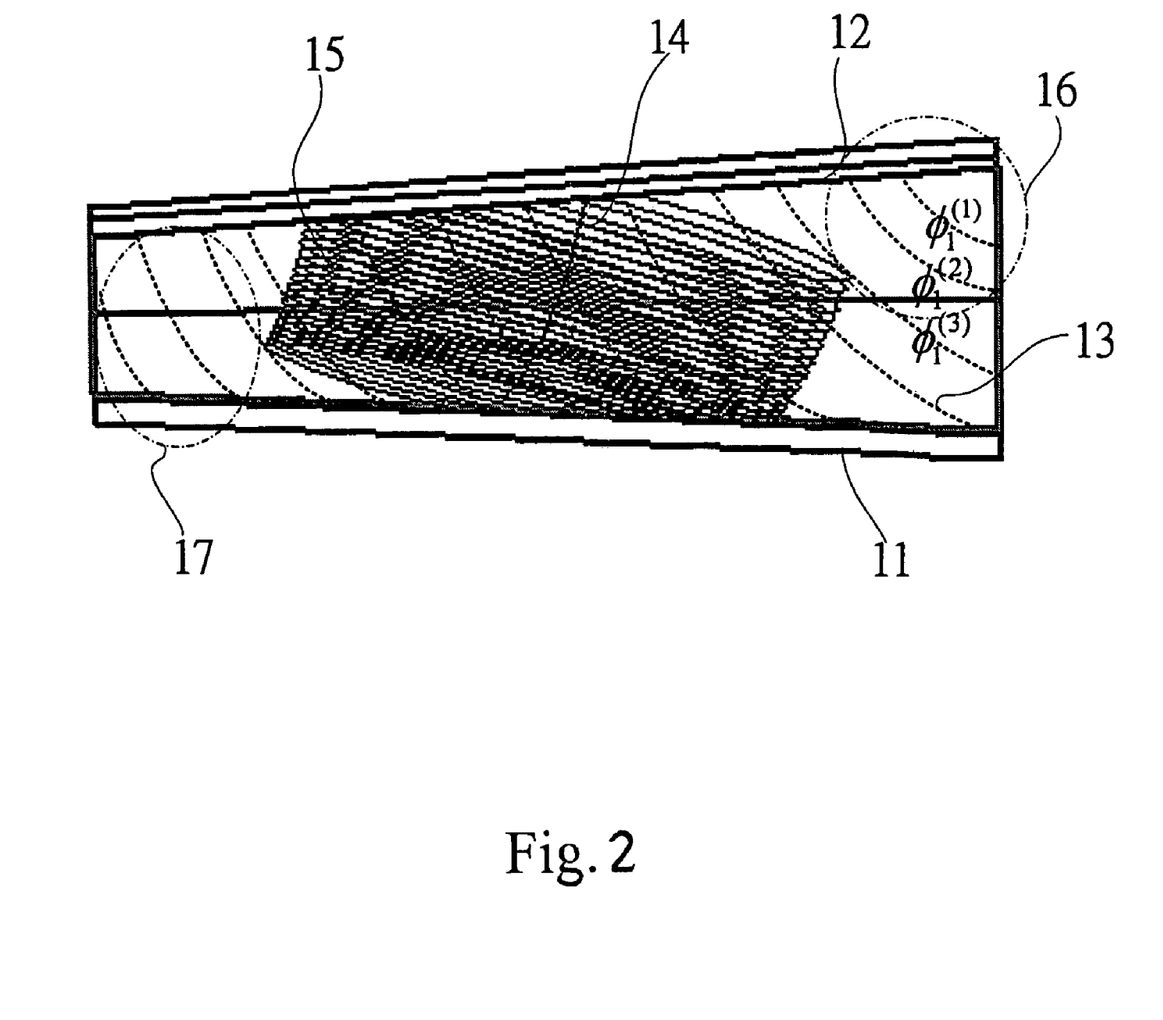
FIG. 2 is an illustrative diagram explaining the tooth surface lengthwise curvature modification method.

Referring to FIG. 2, which shows contact path of spiral bevel or hypoid gears and pinions with respect to cutter, and it is a projection plane of the gear 11 and the pinion 12. Wherein the plotted lines 13 denote the contact lines formed by the cutter during pinion cutting, each contact line represents a rotation angle of the work-gear during gear cutting. The spiral bevel or hypoid gears and pinions are point-contact, for every rotation angle of the gears or pinions there can be found a contact point and a corresponding contact ellipse. A tooth surface contact path 14 and a tooth contact portion 15 are the summation of the contact point and the contact ellipse. In lengthwise curvature correction, in order to improve the adjustability of gear set without increasing the Hertzian contact stress, during the cutting of the tooth contact portion 15, machine settings should be set as far as possible similar (or same) to the value before correction. During the cutting of non-tooth contact portions 16 and 17, the machine settings should be reset. This correction can be achieved by the following methodology.

Figure 3:
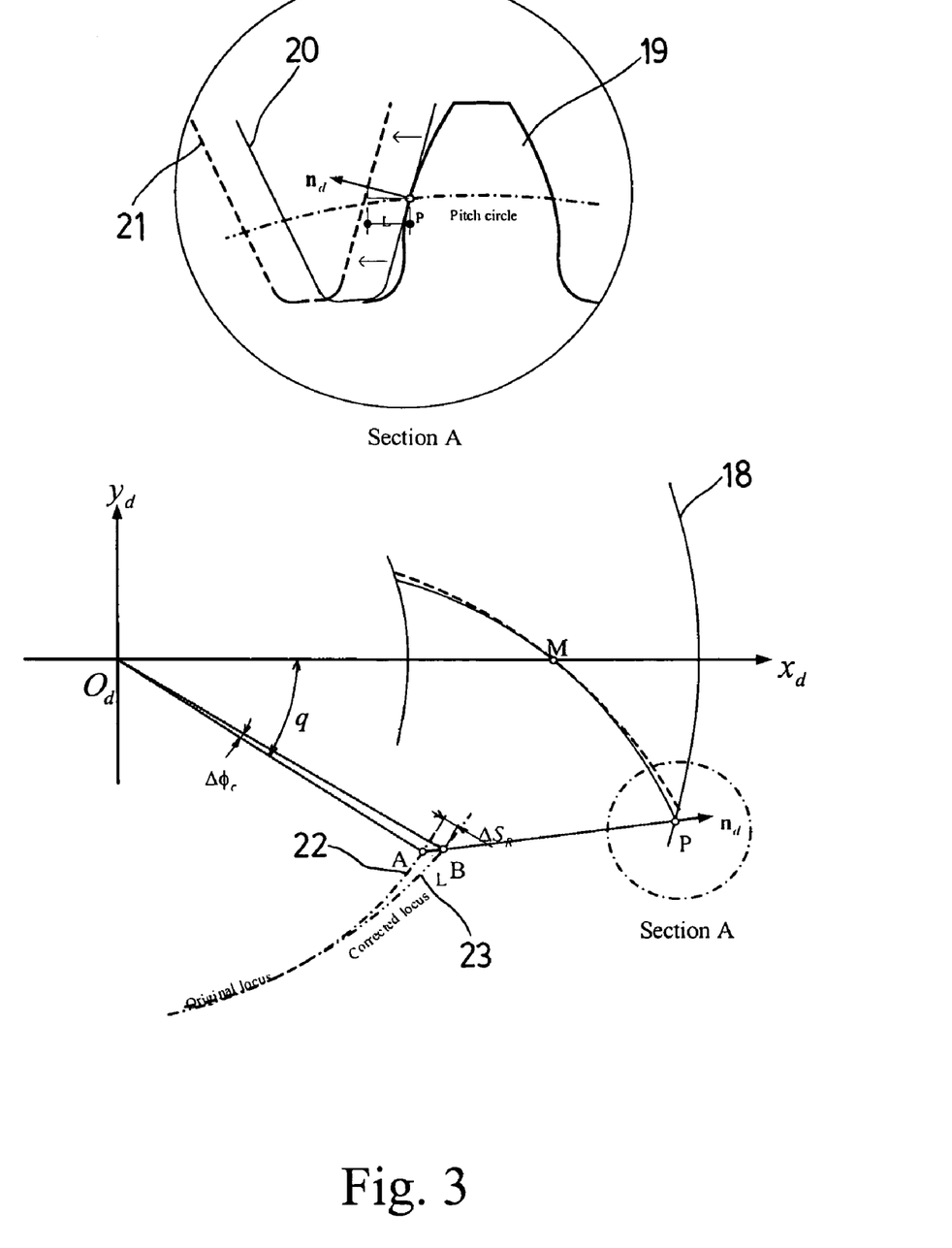
FIG. 3 is an illustrative view showing the locus of the cutter cener and an amplified view of section A.

Assume an imaginary gear 18 is mounted on a sliding block 6, and assume the spindle of the imaginary gear is same as axial line of cradle. A tooth surface of the imaginary gear consists of the locus of the head cutter. The modified kinematic relationship between the head cutter and the imaginary gear is denoted in FIG. 3. Wherein a pinion normal section 19, locus of cutter center before correction 20, kinematic trace of the head cutter center 23, the rotation center of the head cutter traces a circular arc 22 in the machine plane if radial setting is constant. When the cutting of the cutter moves to point P on the pinion tooth surface, the cutter feeds or retracts a correction amount L along the unit normal '$n_d$' of the point P on the pinion tooth surface. The cutter center is adjusted from point A to point B along the unit normal $n_d$ with an amount of correction L. A micro correction of the radial setting $\Delta S_R$ and a micro correction of rotation angle of the cradle $\Delta \phi_c$ will be caused during the movement of the cutter center from point A to point B. There is a special relationship exist between the modified cradle rotation angle $\Delta \phi_c$ and the variation of the cradle radial setting $\Delta S_R$. On the pinion tooth surface, a reference point M is chosen as a datum point, which remains the same as the original without correction. The rotation center of the head cutter traces a circular arc 22 in the machine plane if radial setting is constant, and the circular arc can be expressed by a quadratic equation. The variation of cradle radial setting $\Delta S_R$ and cradle rotation angle $\Delta \phi_c$ are changed accordingly. Assume the variation of cradle radial setting $\Delta S_R$ and cradle rotation angle $\Delta \phi_c$ are $2^{nd}$ order polynomial functions of the work gear rotation angle $\phi_1$ and shown as follows:

$$\Delta S_R = a_t(\phi_1 - \phi_1^{(0)}) + b_t(\phi_1 - \phi_1^{(0)})^2 \quad (1)$$

$$\Delta \phi_c = c_t(\phi_1 - \phi_1^{(0)}) + d_t(\phi_1 - \phi_1^{(0)})^2 \quad (2)$$

Where symbol $\phi_1^{(0)}$ is the initial work gear rotation angle of the reference point M during the generating. Symbols $a_t$, $b_t$, $c_t$, and $d_t$ are the coefficients of the $2^{nd}$ order polynomial function of the variation of cradle radial setting $\Delta S_R$ and cradle rotation angle $\Delta \phi_c$.

On the toe and heel position of the pitch cone, the variation of cradle radial setting $\Delta S_R$ and cradle rotation angle $\Delta \phi_c$ are denoted as $\Delta S_R^{(t)}, \Delta \phi_c^{(t)}, \Delta S_R^{(h)}$, and $\Delta \phi_c^{(h)}$, respectively. And the amounts of correction L on the toe and heel position of the pitch cone are denoted as $L^{(t)}$ and $L^{(h)}$, respectively. The new position of the cutter center B, while the pinion is correcting in the machine plane, is represented as:

$$\begin{cases} B_x = A_x + L^{(i)} n_{d,x} \\ B_y = A_y + L^{(i)} n_{d,y} \end{cases} \quad i = t, h \quad (3)$$

In the machine plane, the variation of cradle radial setting $\Delta S_R$ and cradle rotation angle $\Delta \phi_c$ are represented as another form:

$$\Delta S_R^{(i)} = \sqrt{(B_x^{(i)})^2 + (B_y^{(i)})^2} - S_R^{(0)} \quad i = t, h \quad (4)$$

$$\Delta \phi_c^{(i)} = \tan^{-1}\left(\frac{B_y^{(i)}}{B_x^{(i)}}\right) - (\theta_c + \phi_c^{(0)})$$

Where $S_R^{(0)}$ and $\phi_c^{(0)}$ are the original machine settings of the cradle radial setting and cradle rotation angle, respectively. While the amounts of correction $L^{(i)}$ are giving, the coefficients $a_t$, $b_t$, $c_t$, and $d_t$ are determined by equations (1), (2), (3), and (4), simultaneously. The modified cradle radial setting $S_R$ and cradle rotation angle $\phi_c$ are represented as:

$$S_R = S_R^{(0)} + \Delta S_R$$

$$\phi_c = \phi_c^{(0)} + \Delta \phi_c \quad (5)$$

The analysis for outline and contacting of the pinion can be derived form the equation (5) based on the theory of differential geometry.

We take a curvature modification as an example, wherein the pinion teeth number is 17 and the gear teeth number is 32. Both the gear and the pinion are made by face-milling method, and the head cutter of cradle is not tilt, therefore, i=0,j=0. Since curvature modification is usually related to the pinion, the proposed examples here are the results after the modification of the pinion tooth surface. Followings are the machine settings before the pinion is modified:

(1) Pinion Convex

Point Dia. Of Grind wheel=74.422 mm

Blade Angle=22 D

Fillet Radius=0.18137 mm

Cradle radial setting $S_R$=31.4772 mm

Cradle rotation angle q=1.20989+0.4682930$\emptyset_1$+2.03407×$10^{-3}\emptyset_1^2$+2.57946×$10^{-5}\emptyset_1^3$+1.86084×$10^{-4}\emptyset_1^4$+4.22193×$10^{-6}\emptyset_1^5$+1.66451×$10^{-5}\emptyset_1^6$ Sliding Base=−0.23991 mm Blank Position=0.55302 mm Blank Offset=0.34465 mm Machine Root Angle=25 D 35M 1S (1) Pinion Concave Point Dia. Of Grind wheel=72.644 mm Blade Angle=18 D Fillet Radius=0.18137 mm Cradle radial setting $s_R$=30.6531 mm Cradle rotation angle q=1.34888+0.483281$\emptyset_1$+1.75079×$10^{-3}\emptyset_1^2$+1.85905×$10^{-5}\emptyset_1^3$+1.70513×$10^{-4}\emptyset_1^4$+3.2215×$10^{-6}\emptyset_1^5$+1.62271×$10^{-5}\emptyset_1^6$ Sliding Base=0.2714 mm Blank Position=−0.63106 mm Blank Offset=0.58474 mm Machine Root Angle=25D 35M 1S For pinion convex, the amount of correction on toe and heel position are assumed as $L^{(t)}=30$ μm and $L^{(h)}=8$ μm, respectively.

For pinion concave, the amount of correction on toe and heel position are assumed as $L^{(t)}=13$ μm and $L^{(h)}=20$ μm, respectively.

Substituting the amount of correction of the toe and the heel positions for the pinion convex and concave sides and the original position of the cutter center A into the equations (1)–(4), there are there are two sets of parameters calculated for pinion convex (I.B.) and concave (O.B.) sides as follows:

| Correct parameters | Pinion Convex | Pinion Concave |
|---|---|---|
| $a_t$ | $2.524 \times 10^{-3}$ | $1.496 \times 10^{-3}$ |
| $b_t$ | $1.172 \times 10^{-1}$ | $-9.8 \times 10^{-2}$ |
| $c_t$ | $4.99 \times 10^{-4}$ | $6.15 \times 10^{-4}$ |
| $d_t$ | $3.946 \times 10^{-3}$ | $-4.473 \times 10^{-3}$ |
| $L^{(t)}$ | 30 μm | 13 μm |
| $L^{(h)}$ | 8 μm | 20 μm |

Figure 4:
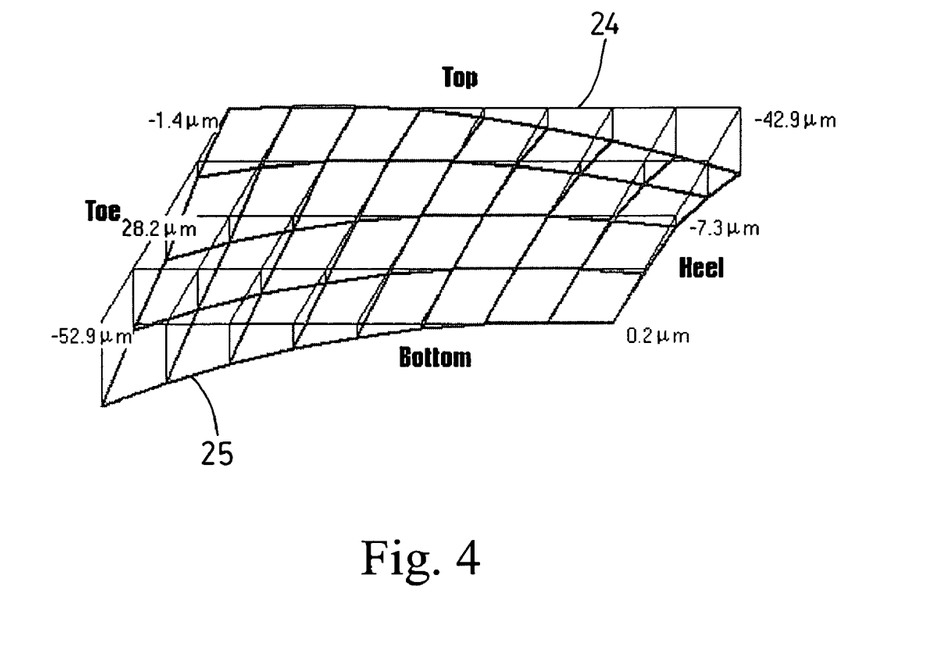
FIG. 4 is tooth topological error map of pinion convex.
Figure 5:
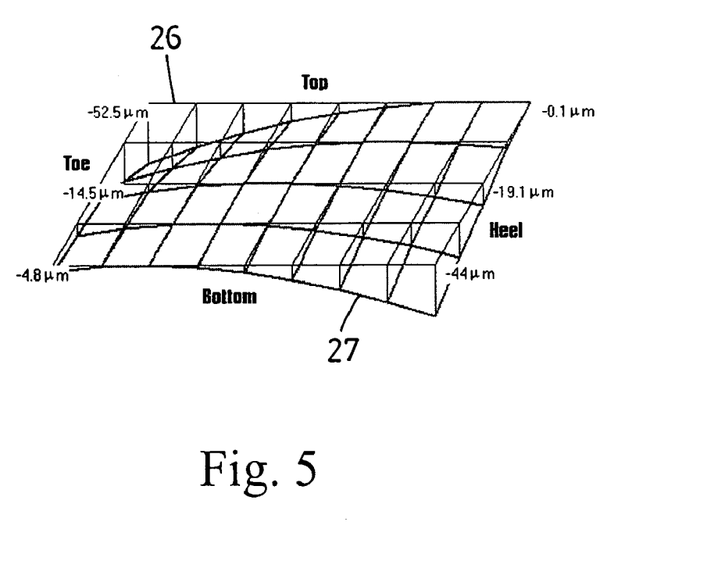
FIG. 5 is tooth topological error map of pinion concave.
Figure 6:
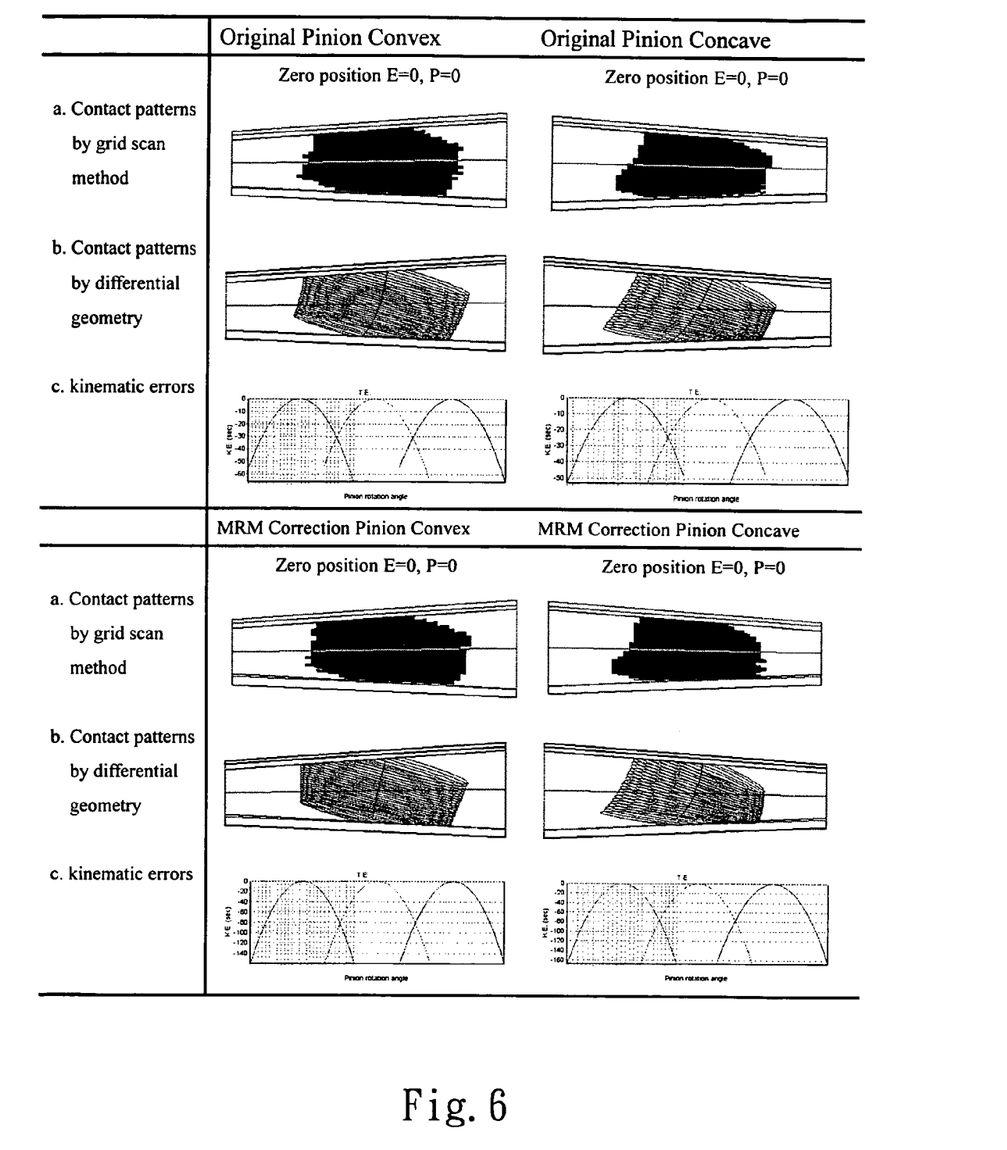
FIG. 6 is a comparison showing the results before and after MRM correction at zero position.
Figure 7:
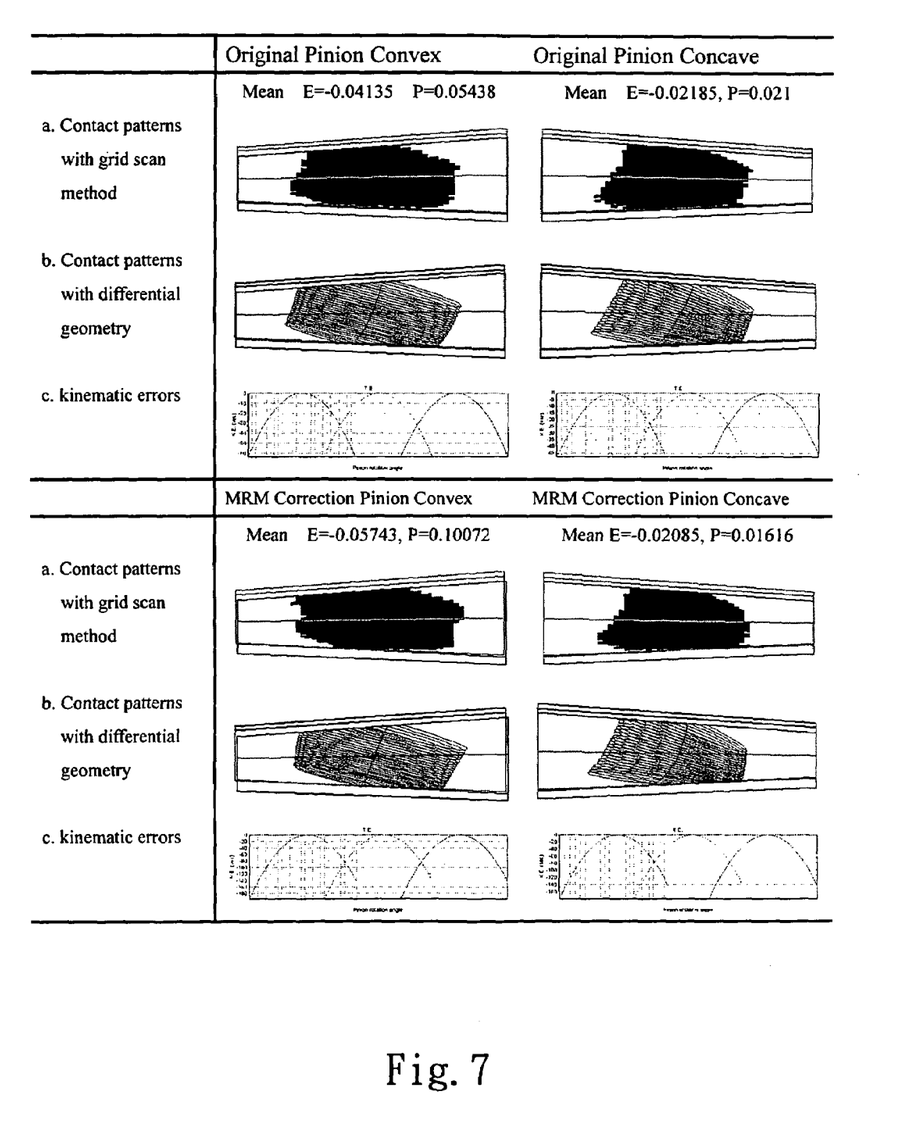
FIG. 7 is a comparison showing the results before and after MRM correction at mean position.

The corresponding tooth surface topology comparison is shown in FIG. 4 for pinion convex. As shown in FIG. 4, the reference surface 24 is generated by the original machine settings while the corrected surface 25 is generated by the modified machine settings. The corresponding tooth surface topology comparison is shown in FIG. 5 for pinion concave. As shown in FIG. 5, the reference surface 26 is generated by the original machine settings while the corrected surface 27 is generated by the modified machine settings. As can be learned from FIGS. 4 and 5 that the amounts of ease-offs at toe and heel positions are close to the assigned values on pinion both sides, so that the proposed method is workable.

Figure 8:
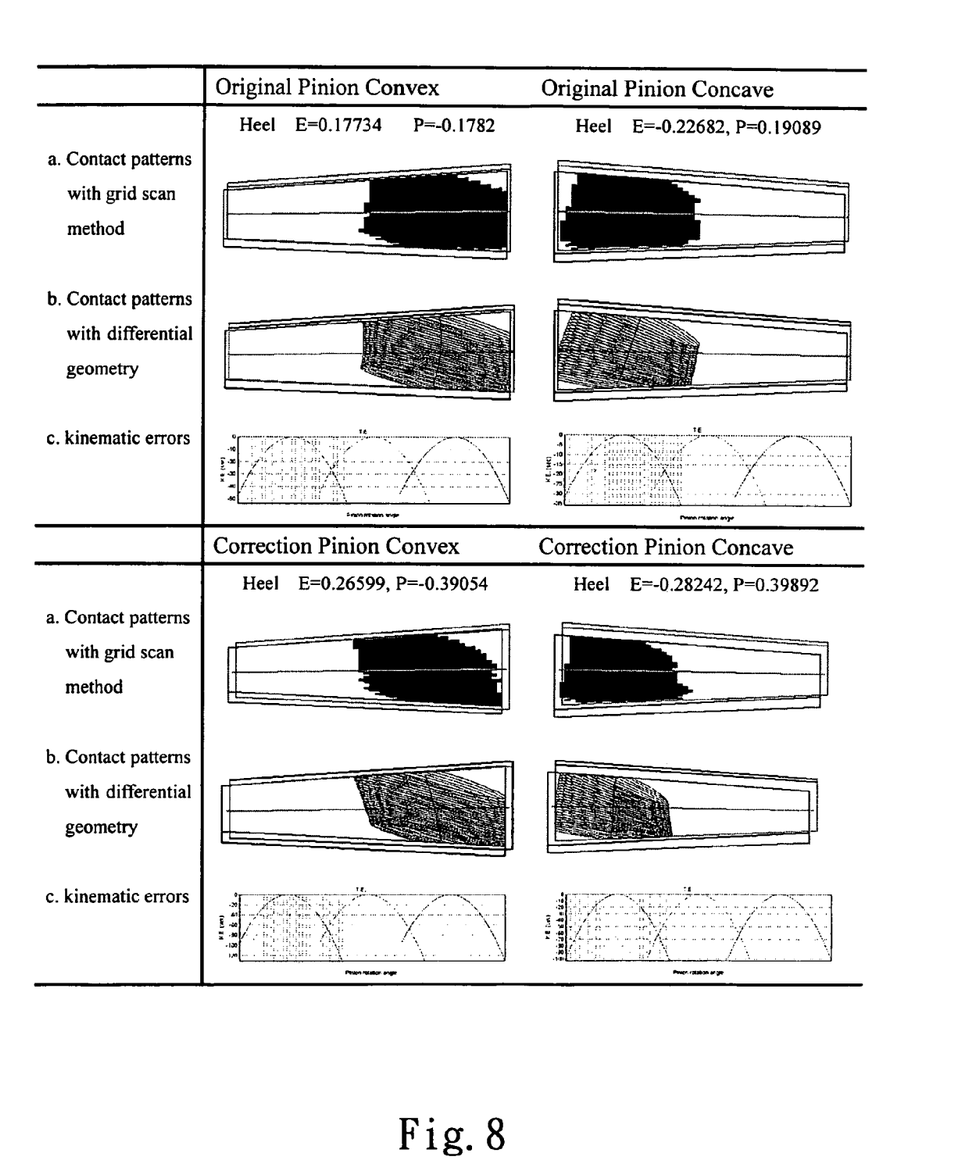
FIG. 8 is a comparison showing the results before and after MRM correction at heel position.
Figure 9:
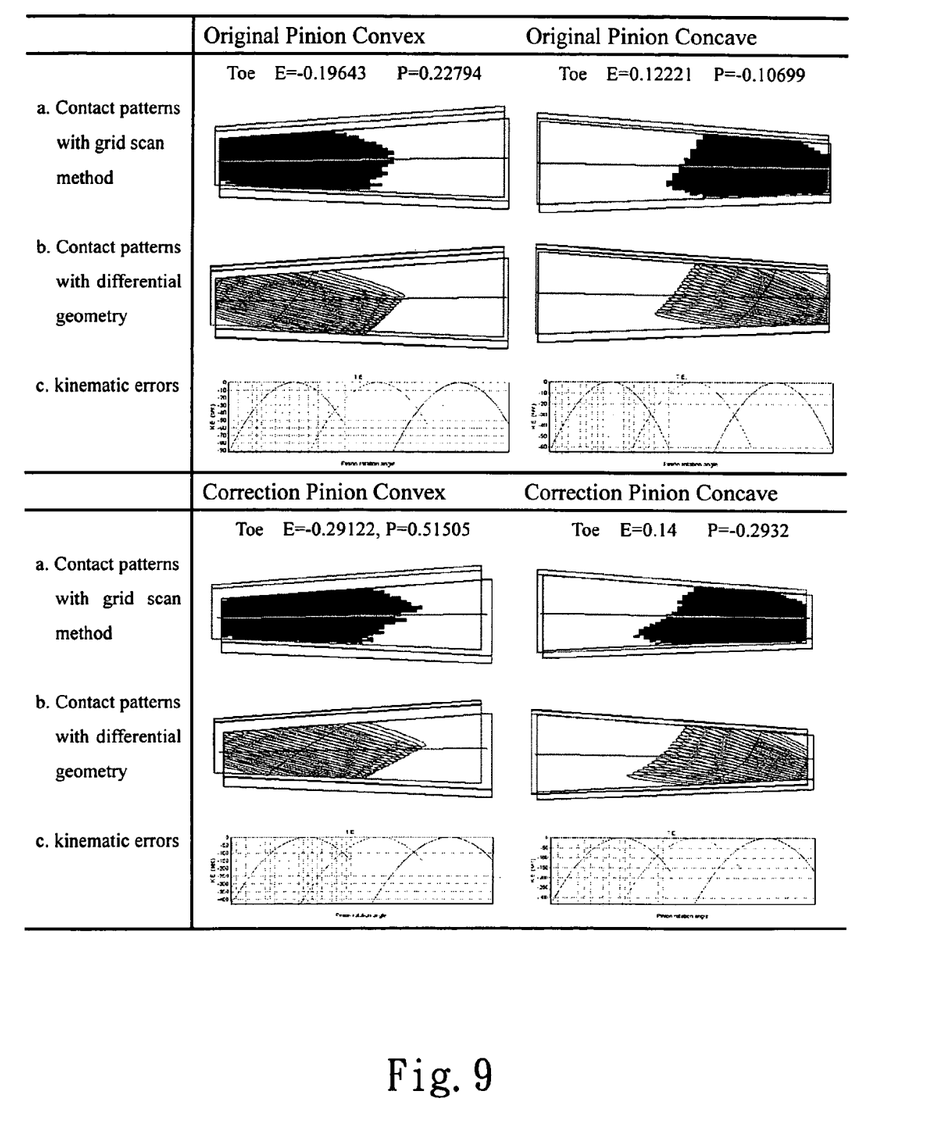
FIG. 9 is a comparison showing the results before and after MRM correction at toe position.
Figure 10:
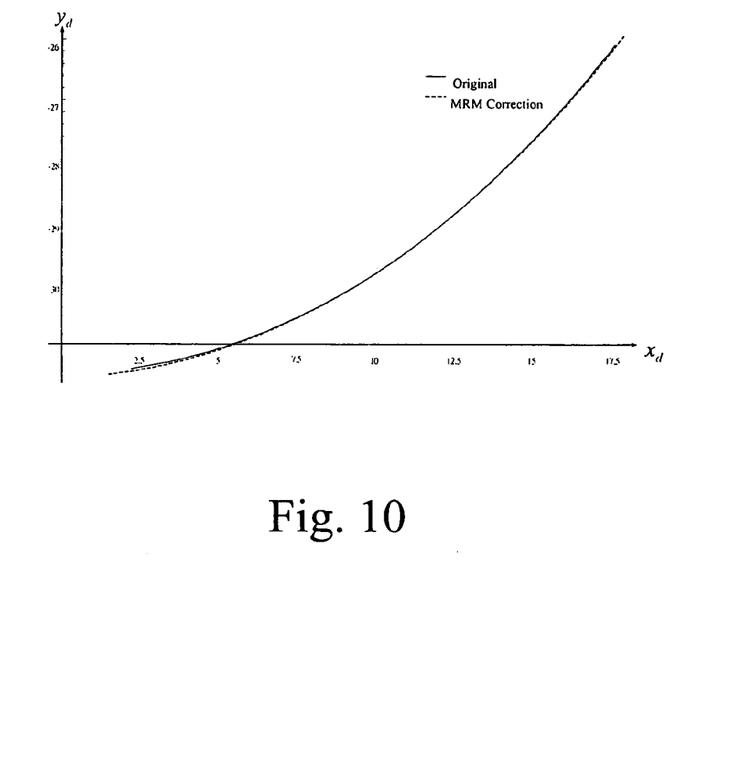
FIG. 10 is a comparison showing the locus of cutter center of pinion convex in the machine plane before and after MRM correction.
Figure 11:
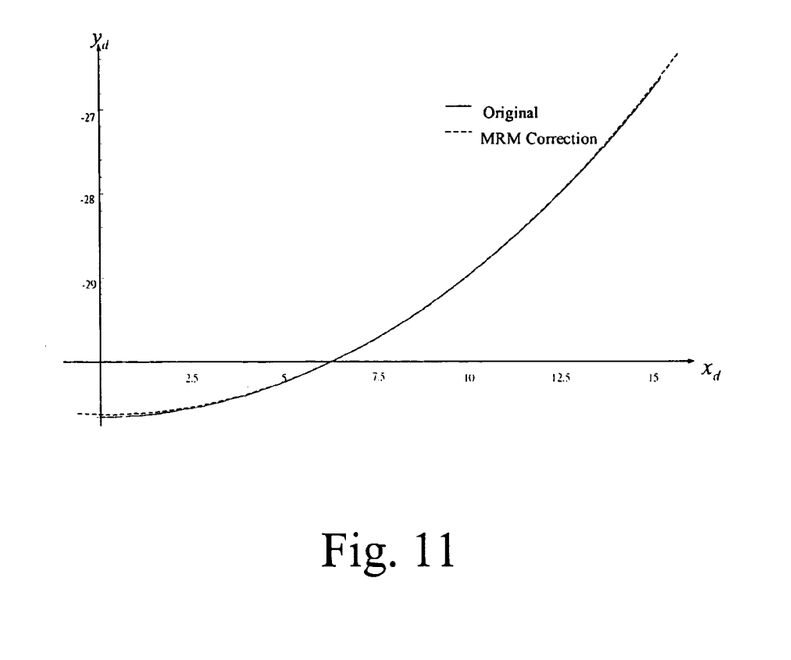
FIG. 11 is a comparison showing the locus of cutter center of pinion concave in the machine plane before and after MRM correction.
Figure 12:
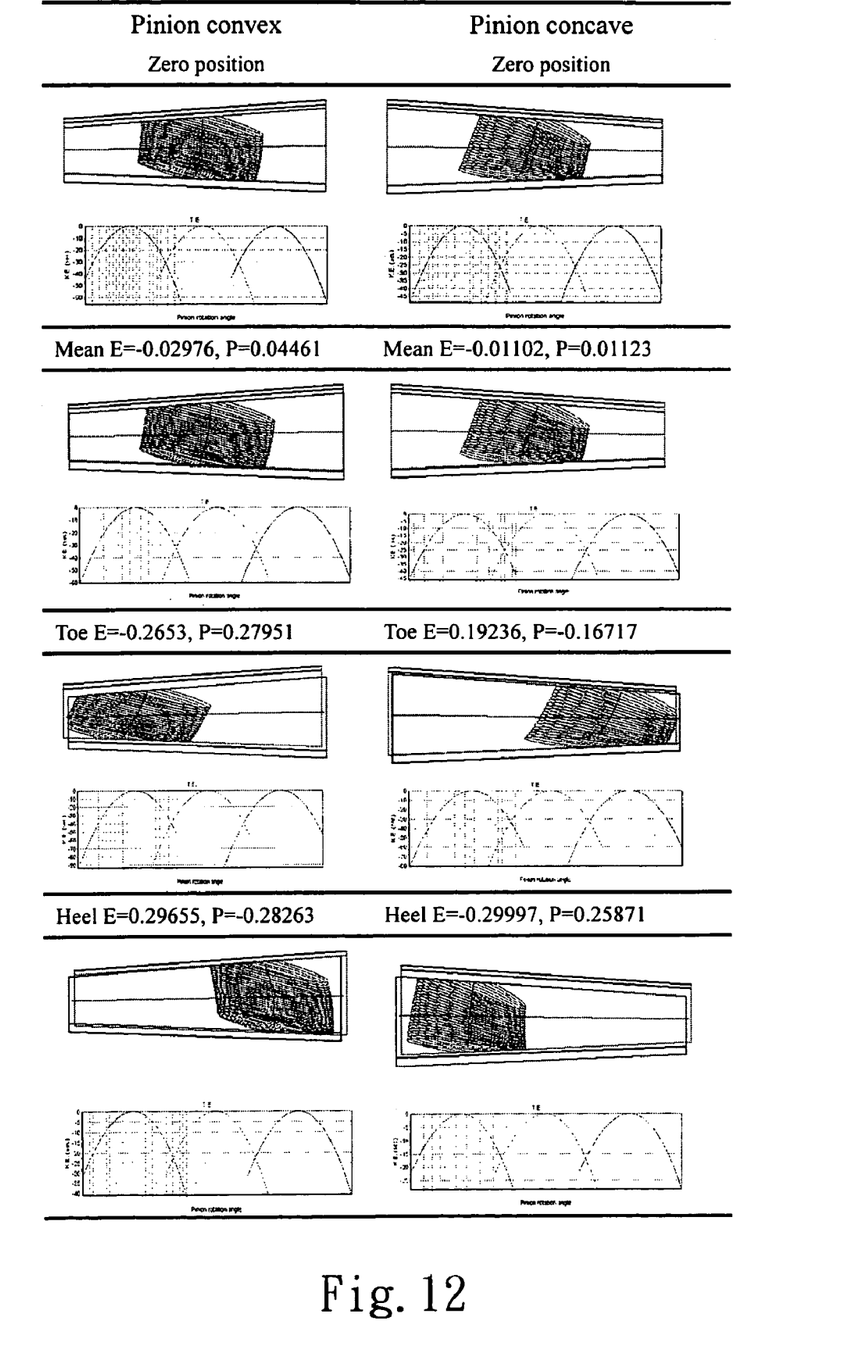
FIG. 12 shows the contact pattern and motion curves after modification with conventional method.

FIGS. 6–9 shows the comparison of the contact pattern and motion curves before and after modification at the zero, mean, heel, and toe positions, respectively. The contact patterns are obtained from two methods: (1) the grid scan method, (2) the differential geometry method. By comparing the results obtained by the grid scan method and the differential geometry method, the contact patterns are almost identical. FIGS. 10 and 11 show the comparison of the locus of cutter center for the pinion convex and pinion concave before and after modification. In the contact pattern, the locus of the cutter center is almost the same. FIG. 12 shows the contact pattern and motion curves before and after modification respectively. The bearing ration comparisons between the Modified Radial Motion (MRM) and conventional method are shown as follows:

| | Bearing ratio Pinion Convex | Bearing ratio Pinion Concave |
|---|---|---|
| Original | 0.540 | 0.487 |
| Correction by the MRM method | 0.542 | 0.487 |
| Correction by the conventional method | 0.450 | 0.420 |

It can be learned from the above results that the bear ratios before and after using MRM method, however, based on the conventional lengthwise curvature change, the bearing ratio is decreased 15% in average, as a result, the Heizian contact stress is increased. As shown in FIGS. 8 and 9, with the proposed MRM method, the offset movement (V) increases 49.1% and 21.0% on pinion convex and pinion concave sides, respectively. The tolerances of pinion axial movement (H) increase 123.0% and 132.3.0% on pinion convex and pinion concave sides, respectively. The corresponding results of conventional method as shown in FIG. 12, the tolerances of offset movement (V) increase 50.3% and 41.0% on pinion convex and pinion concave sides, respectively. The tolerances of pinion axial movement (H) increases 38.4% and 43.0% on pinion convex and pinion concave sides, respectively. The results show that the propose method of the present invention improves 50% adjustability of gear set without changing the bearing ratio. Thereby, the present invention can bring lots of economical benefits to the industrial sector.

Figure 13:
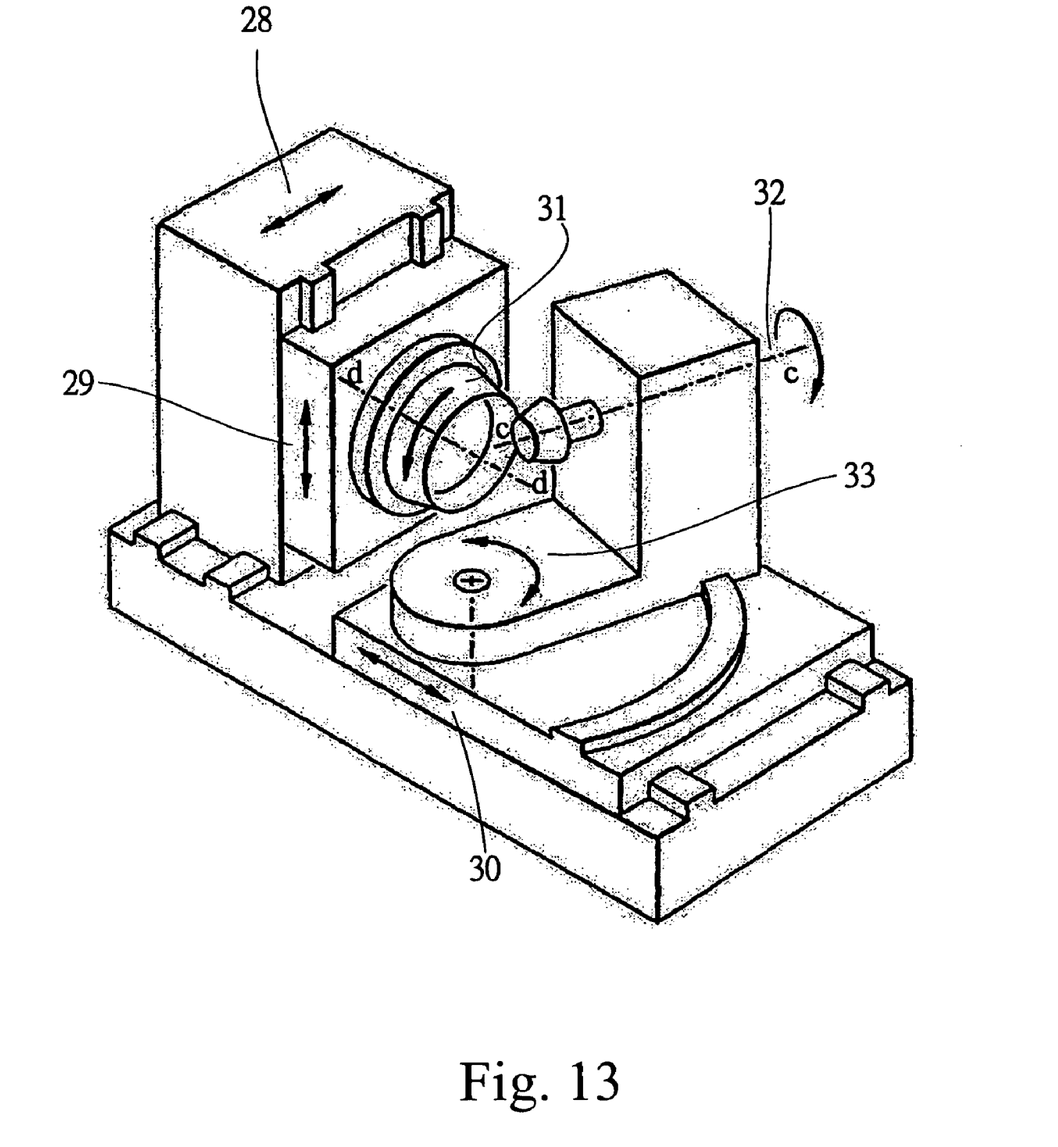
FIG. 13 is a structural view of CNC orthogonal type hypoid generator.
Figure 14:
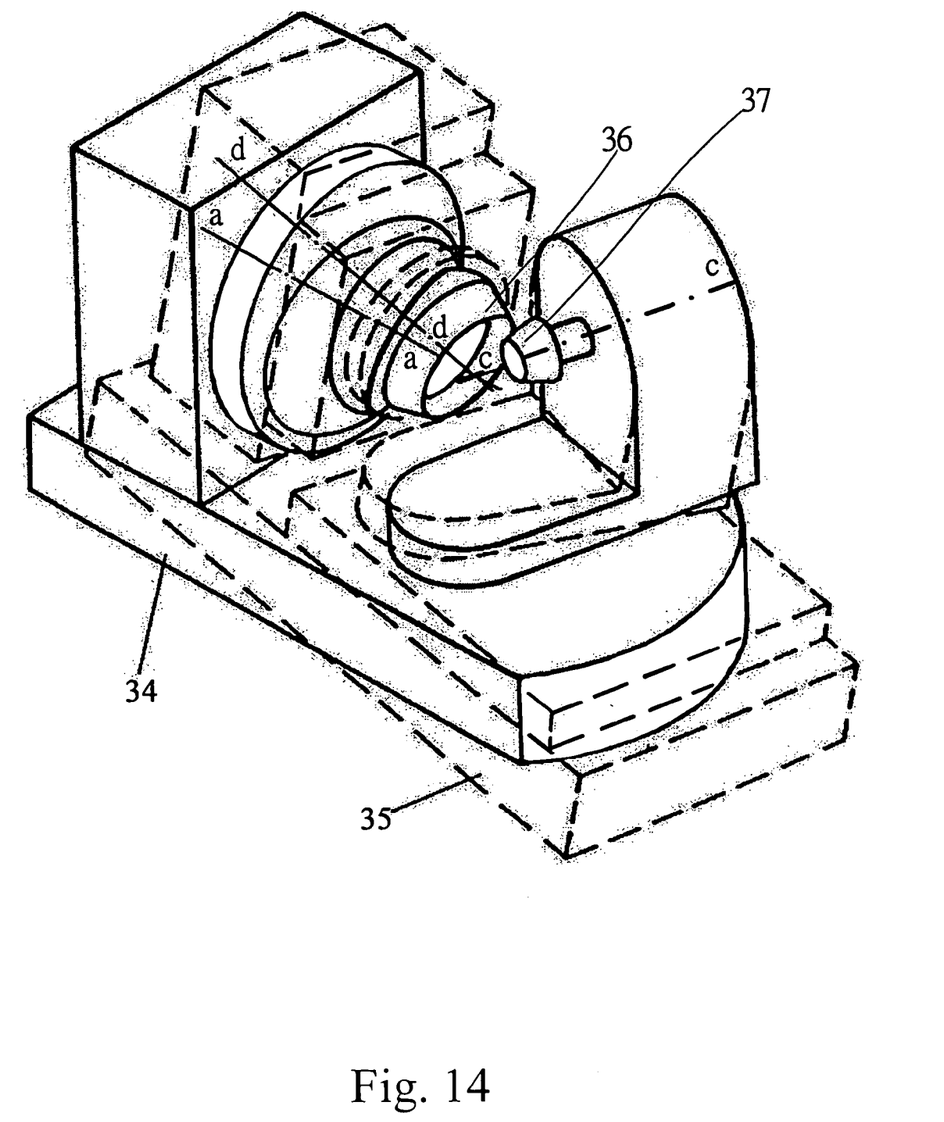
FIG. 14 is an illustrative diagram showing the spatial relationship between the cutter and the work gear of a hypoid generating machine system, which is combined by cradle type and orthogonal type hypoid generating machine.

CNC hypoid generator has taken the place of the conventional cradle type hypoid generator. As shown in FIG. 13, wherein the motion of the CNC hypoid generator is a holding type and orthogonal motion, the CNC hypoid generator includes three translational axes (x-axis 28, y-axis 29, z-axis 30) and three revolving axes (cutter-axis 31, work-gear-axis 32 and machine-root-angle-axis 33). The CNC hypoid generator provides the least dynamic information for the designer although it is most flexible to design new tooth shape. In this case, we substitute the lengthwise curvature modifying method of the cradle type into the CNC hypoid generator. In a different hypoid generating system (as shown in FIG. 14), by taking use of the kinematic spatial relationship between the cutter 36 and the work-gear 37, that is, on the condition that the spatial oppositions of the cutter 36 and the work-gear 37 are identical, the machine settings of hypoid generating system is changed (cradle type 34 is changed into holding-orthogonal type 35).

While we have shown and described various embodiments in accordance with the present invention, it should be clear to those skilled in the art that further embodiments may be made without departing from the scope of the present invention.

What is claimed is:

1. A modified radial motion (MRM) method for modifying lengthwise curvature of face-milling spiral bevel and hypoid gears for modifying lengthwise curvature of face-milling spiral bevel and hypoid gears by providing modified radial motion of a head cutter and by cooperating with rotation of a cradle without changing the head cutter's geometry;

wherein the modified radial motion of the head cutter and a rotation angle of the cradle are nonlinear functions of a rotation angle of work-gear and a rotation angle of the cradle, a locus of the head center is achieved by a constant radial setting and by modifying a vertical distance $E_m$ between work-gear-axis c—c and cradle-axis a—a, a coefficient of the high-order polynomial formula form of the modified radial motion of the head cutter and the rotation angle of the cradle is determined by amount of correction at an arbitrary position on a tooth face, the head cutter is adjusted along unit normal of tooth surface of the cutter, a new position of the cutter center in machine plane will be correspondingly decided, and new positions of the head cutter center in machine plane will be correspondingly decided after giving amounts of correction at plural positions to be corrected, with the new positions, the coefficient of the high-order polynomial form of the modified radial motion of the head cutter and rotation angle of the cradle will be determined;

whereby during the process of modifying the lengthwise curvature, radial setting of the head cutter will change with the rotation of the cradle, and a rotation center of the head cutter will trace a circular arc in a machine plane if radial setting is constant, so that an adjustability of gear set will be improved without changing the bearing ratio.

2. The MRM method as claimed in claim 1, wherein the modified radial motion of the head cutter is applied to a hypoid and spiral bevel generator with and without a tilt head cutter.

3. The MRM method as claimed in claim 1, wherein the modified radial motion of the head cutter is applied to holding-type-orthogonal CNC hypoid and spiral bevel generators.

* * * * *